United States Patent

Goossens et al.

[11] Patent Number: 6,037,766
[45] Date of Patent: Mar. 14, 2000

[54] WHEEL BEARING ROTARY MOTION SENSOR HAVING SENSOR-ACCOMMODATING HOUSING

[75] Inventors: Andre F. L. Goossens, Rumst; Andre de Witte, Ahrtselaar, both of Belgium

[73] Assignee: ITT Manufacturing Enterprises Inc., Wilmington, Del.

[21] Appl. No.: 08/836,780

[22] PCT Filed: Dec. 13, 1995

[86] PCT No.: PCT/EP95/04922

§ 371 Date: Oct. 21, 1997

§ 102(e) Date: Oct. 21, 1997

[87] PCT Pub. No.: WO96/22536

PCT Pub. Date: Jul. 25, 1996

[30] Foreign Application Priority Data

Jan. 18, 1995 [DE] Germany .......................... 195 01 268

[51] Int. Cl.[7] .............................. G01P 3/44; G01P 3/488
[52] U.S. Cl. .................. 324/173; 324/174; 324/207.25; 384/348
[58] Field of Search .................................. 324/160, 163, 324/166, 173, 174, 175, 178, 179, 207.2, 207.21, 207.25, 207.22, 207.26, 260; 73/488, 493, 494; 384/448, 449

[56] References Cited

U.S. PATENT DOCUMENTS

| 4,125,339 | 11/1978 | Pittinger, Sr. et al. | 403/348 |
| 5,145,276 | 9/1992 | Demange | 403/349 |

FOREIGN PATENT DOCUMENTS

| 438624 | 7/1991 | European Pat. Off. . |
| 487405 | 11/1991 | European Pat. Off. . |
| 2676264 | 11/1992 | France . |
| 2698421 | 5/1994 | France . |
| 2948984 | 6/1980 | Germany . |
| 3717180 | 12/1988 | Germany . |
| 3809886 | 10/1989 | Germany . |
| 4032476 | 4/1991 | Germany . |
| 4033064 | 4/1992 | Germany . |
| 4142181 | 5/1993 | Germany . |
| 4201328 | 7/1993 | Germany . |
| 4206910 | 7/1993 | Germany . |
| 4213977 | 11/1993 | Germany . |
| 4213979 | 11/1993 | Germany . |

OTHER PUBLICATIONS

German Patent Application No. G9010131.6 dated Dec. 6, 1990.

Japanese Patent Application No. 63–166601.

*Primary Examiner*—Jay Patidar
*Attorney, Agent, or Firm*—Rader, Fishman & Grauer PLLC

[57] ABSTRACT

A wheel bearing sensor for measuring rotary motion of a wheel includes a signal generator ring that rotates with the wheel and a sensor-accommodating housing, which is a rotation-symmetric element, such as a deep drawn sheet-metal part. This housing accepts a speed sensor in a sensor insertion side and retains the sensor in a fixed position. A radially outwardly directed flange on this side of the housing engages a sensor flange on the sensor when the sensor is inserted in the sensor insertion side of the sensor-accommodating housing. The sensor flange has prongs that engage the tooth gaps when the speed sensor is inserted into the housing. These prongs backgrip the teeth when the speed sensor rotates within the housing.

7 Claims, 3 Drawing Sheets

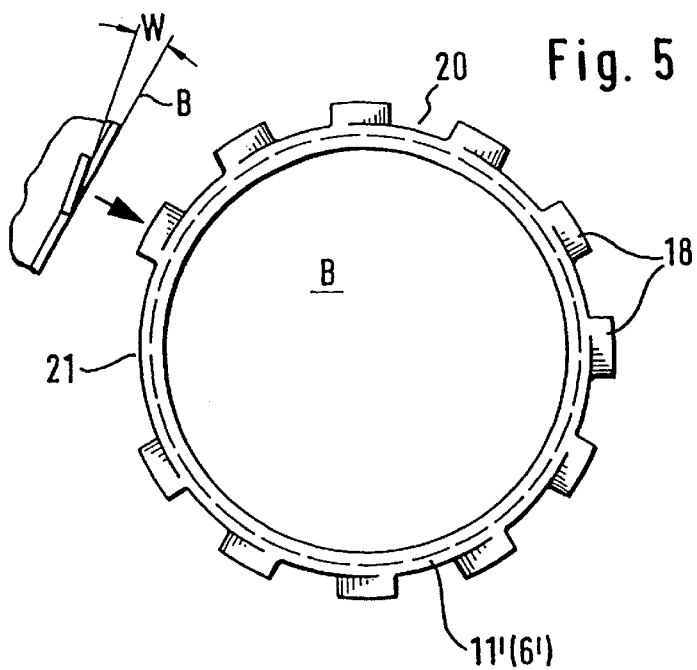
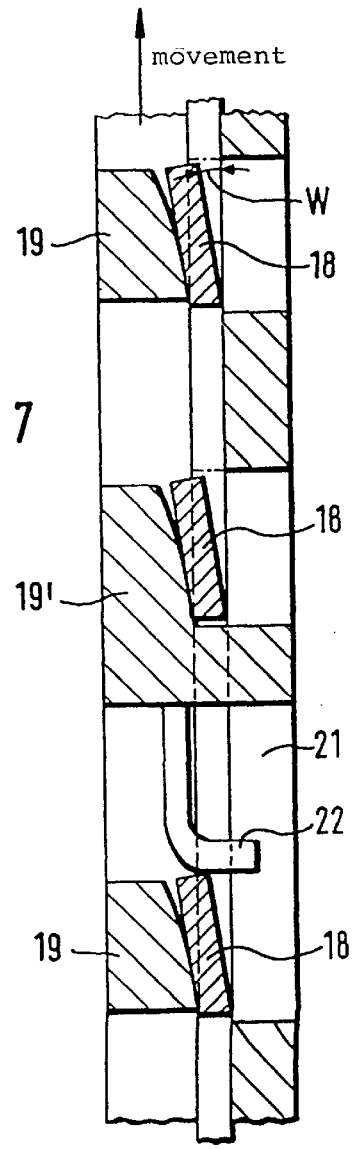
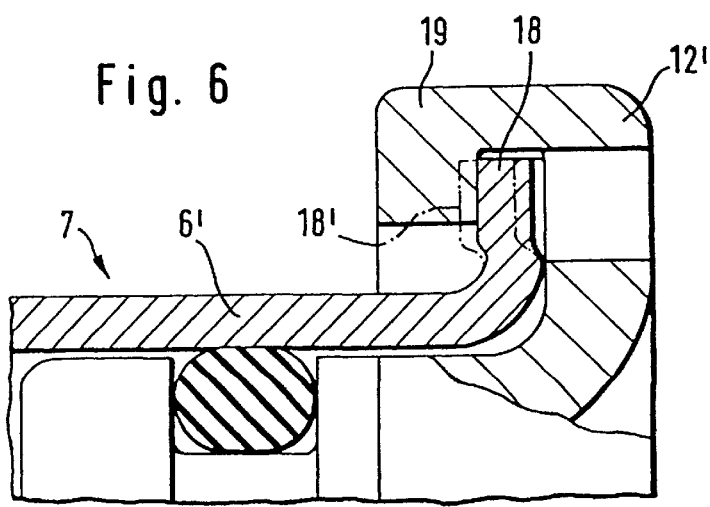

Figure 2:
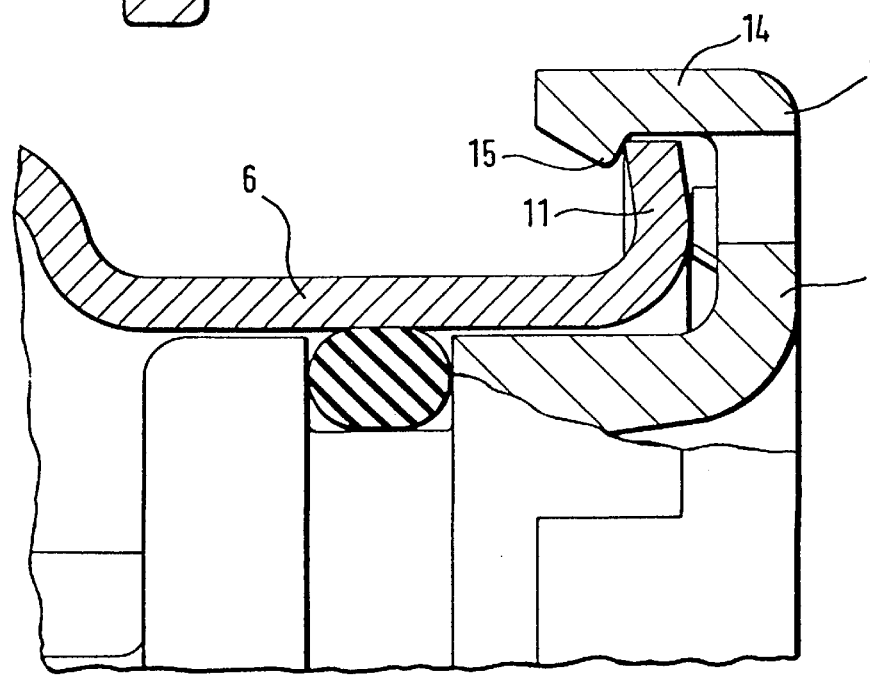
Figure 3:
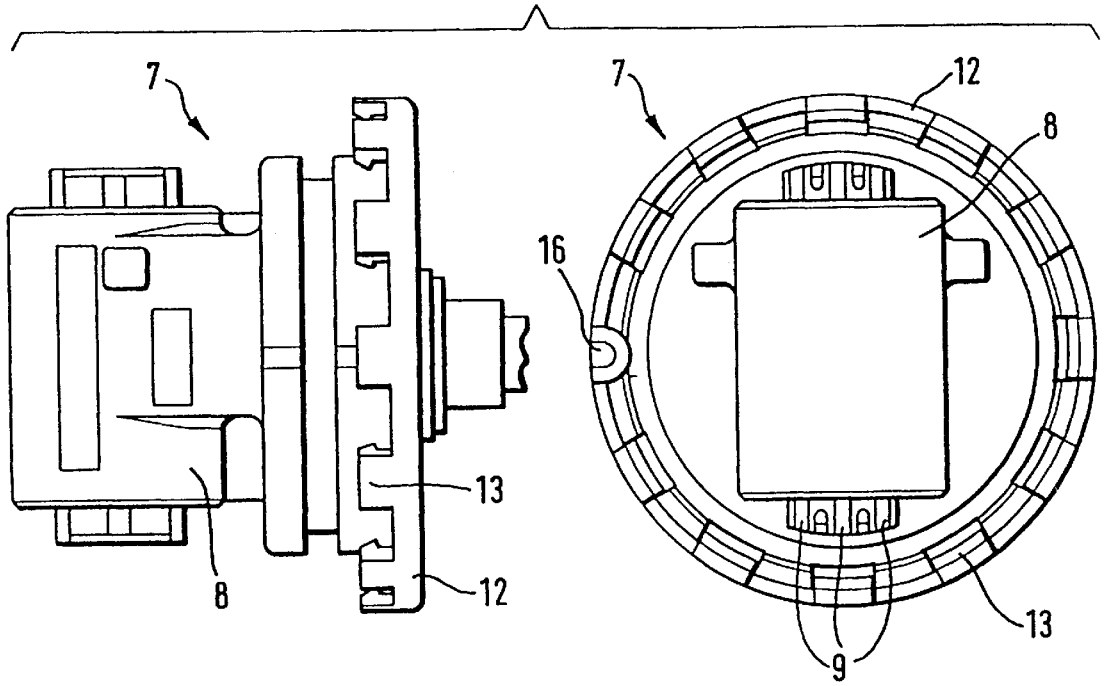

WHEEL BEARING ROTARY MOTION SENSOR HAVING SENSOR-ACCOMMODATING HOUSING

TECHNICAL FIELD

The present invention relates to a device used for measuring rotary motions, and more paraticularly relates to a rotating signal generator, a stationary sensor used as a transducer, and a sensor-accommodating housing which accommodates the sensor and which positions and retains the sensor in this position, with the sensor being insertable into the housing.

BACKGROUND OF THE INVENTION

German patent application No. 42 06 910 discloses a measuring device which is generally composed of a signal generator ring, a stationary sensor and a housing used as a sensor holding means. The sensor is inserted into the housing and positioned and retained therein in a predetermined position. The sensor is preferably a wheel bearing sensor.

In German patent application No. 42 13 977, the sensor and sensor housing of a wheel bearing sensor of this type are arranged in the axis of rotation of the wheel whose rotary motion is to be measured. An annular or bowl-shaped component having inwardly directed teeth that rotates with the wheel is used as a signal generator. The sensor includes a double-sided measuring coil having pole shoes that project from both sides and extend as far as the inside surface of the signal generator. The sensor of this reference is also inserted into the associated sensor-accommodating housing.

Wheel bearing sensors of this type are required, for example, in automotive vehicles for measuring the rotating speeds of the individual vehicle wheels when the vehicle is equipped with an anti-lock or traction slip control system, or any other vehicle control system. Reliability in operation, but also manufacturing and assembling costs, is of vital importance in such applications.

The generic German publication No. 40 33 064 also discloses a device for measuring rotary motions. In this reference, the exact position of the sensor relative to the component to be monitored can be adjusted during the assembly by way of projections on the sensor-accommodating housing. The projections interact with an adjusting member in which the sensor is arranged. The manufacture of a device of this type, however, is complicated and costly.

An object of the present invention is to construct a bearing sensor or a measuring device of this type so that the expenditure in manufacture and the time required for positioning and fixing the sensor in the predetermined angular position and axial position are minimized.

SUMMARY OF THE INVENTION

The special features of the present invention include the design of the sensor-accommodating housing, above all, the design of the flange on the insertion side of the housing, and the shaping of the corresponding flange formed on the sensor. Due to the shaping, the accommodating housing can be produced particularly simply and with little effort, for example, as a deep-drawn sheet-metal part, and can be machined by punching recesses, etc. When the sensor is inserted into the sensor-accommodating housing, positioning in the predetermined angular position and resilient engagement of the flanges and, consequently, reliable retaining in the exactly predetermined angular and axial positions is automatically ensured.

Further advantages, features and possible applications of the present invention can be taken from the following description of embodiments and details, making reference to the accompanying drawings.

BRIEF DESCRIPTION OF THE DRAWINGS

FIG. 1 is a longitudinal cross-sectional view of a wheel bearing including a sensor accommodation and an inserted sensor according to an embodiment of the present invention.

FIG. 1A is a side view and end view of the sensor of the present invention.

FIG. 2 is an enlarged view of a flange portion of the sensor-accommodating housing forming part of the wheel bearing depicted in FIG. 1.

FIG. 3 is an enlarged partial cross-sectional view of showing a point of connection between a flange of the sensor-accommodating housing and a flange of the sensor in the embodiment depicted in FIG. 2.

FIG. 4 is a schematic, cross-sectional, unwound view of the circumferential surface of the flange connection of FIG. 3.

DETAILED DESCRIPTION OF THE PREFERRED EMBODIMENTS

FIG. 1 explains the basic design and arrangement of a wheel bearing sensor or a measuring device of the present invention in the axis of rotation of a vehicle wheel. Wheel bearing 1 generally includes a wheel bearing outside ring 2, a wheel bearing inside ring 3, and bearing balls 4. Part of a wheel shaft 5, which is seated in the wheel bearing inside ring 3, is also shown. The axis of rotation A of the wheel bearing 1 is represented by a dash-dot line.

A sensor-accommodating housing 6 which is preferably in the form of a rotationally symmetric, deep-drawn sheet-metal part is rigidly connected to the stationary wheel bearing outside ring 2 mounted on the vehicle. According to one aspect of the present invention, the sheet-metal part, or the sensor-accommodating housing 6, is attached on the wheel bearing outside ring 2 by snug fit or press fit.

A sensor 7 used as a transducer is disposed in the sensor-accommodating housing 6. Sensor 7 is inserted into the sensor-accommodating housing and positioned and retained by the housing in the predetermined axial and angular positions.

As shown in FIG. 1A, sensor 7 includes a double-sided measuring coil 8. Measuring coils of this type are described, for example, in the above-mentioned German patent application No. 42 13 977. Pole shoes 9 project from both sides of the coil and extend as far as the inside surface of a signal generator ring 10 is used as a transducer. Ring 10 is connected to the wheel bearing inside ring 3 and, consequently, rotates along with the wheel or the axle 5, the rotary motion of which is to be measured. The signal generator ring 10 is provided with inwardly directed teeth or projections. A narrow air gap is disposed between the teeth and the ends of the pole shoes 9, with the result that the signal generator ring 10 can freely rotate about the double-sided measuring coil 8 and induce variations in the magnetic field in a known manner. The magnetic field variations cause the generation of an electric signal, representative of the wheel movement, at the output of the sensor 7.

The essence of the present invention involves attaching, positioning and fixing the sensor 7 in the sensor-accommodating housing 6. The design of the connection chosen in the present embodiment is shown in FIG. 2. The sensor-accommodating housing 6 ends at the insertion side of the sensor 7 in a radially outwardly directed annular flange 11. A flange 12 is shaped at sensor 7 (FIG. 1A) in a corresponding manner. In the embodiment of FIG. 2, the flange 11 of the sensor-accommodating housing has teeth 18 on its radially outwardly directed flange parts on the insertion side of sensor 7. Teeth 18 are set relative to the end face B of flange 11 which extends perpendicularly to the axis of rotation of the wheel bearing and, thus, also the sensor 7. Thus, the individual teeth are arranged at an acute angle of inclination W relative to the end face B, or the surface defined within the annular flange 11. This can be seen particularly clearly in FIG. 4. In FIG. 3, the difference caused by the deflection is indicated by the dotted lines of the tooth cross-section 18'.

Figure 1:
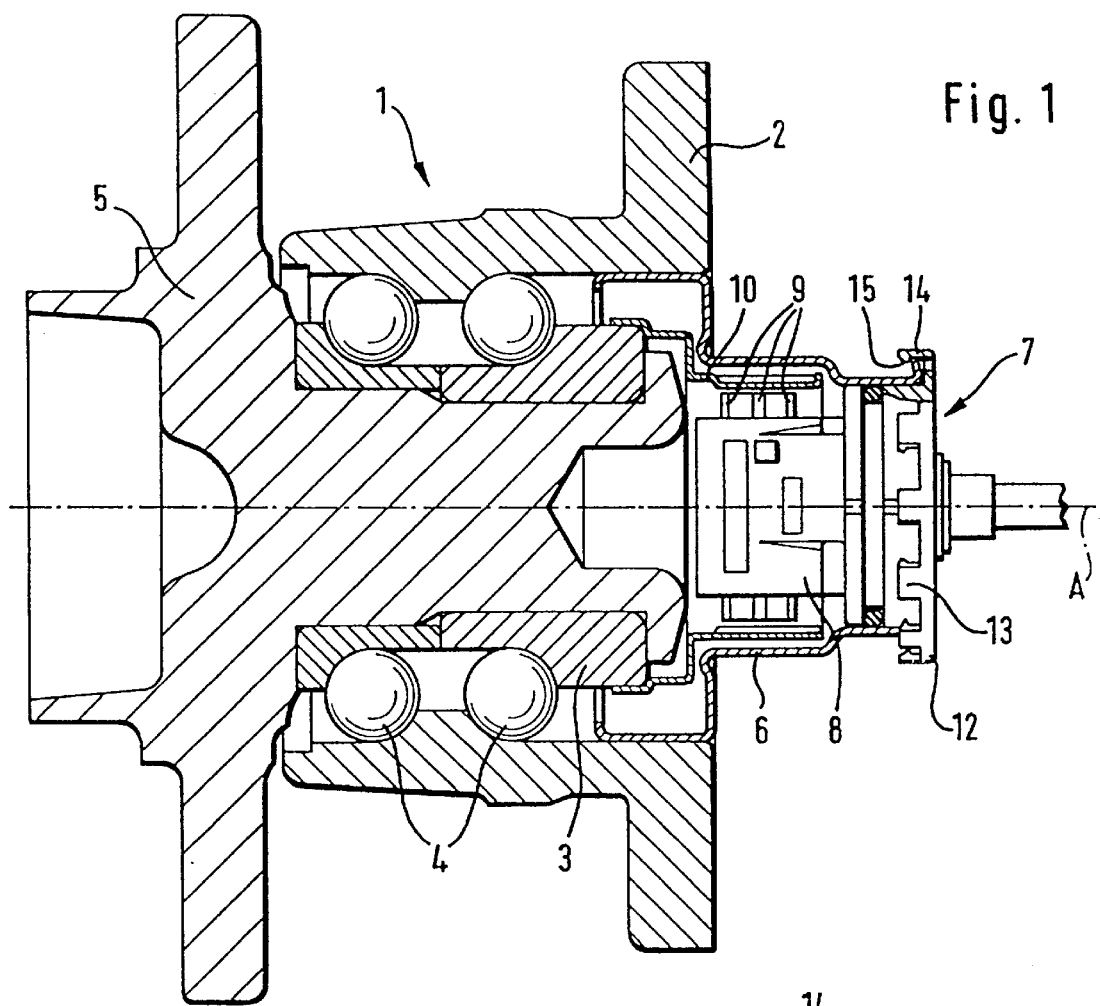

As shown in FIG. 1A, the flange 12 shaped at the sensor 7 ends in prongs 19 which are arranged so as to be spread over the periphery. As shown in FIG. 3, prongs 19 embrace and backgrip the individual teeth 18. The sensor flange 12 is resiliently retained on the flange 11 of the sensor-accommodating housing, or on the teeth 18', when the sensor-accommodating housing 6 is made of a resiliently elastic material.

Figure 4:
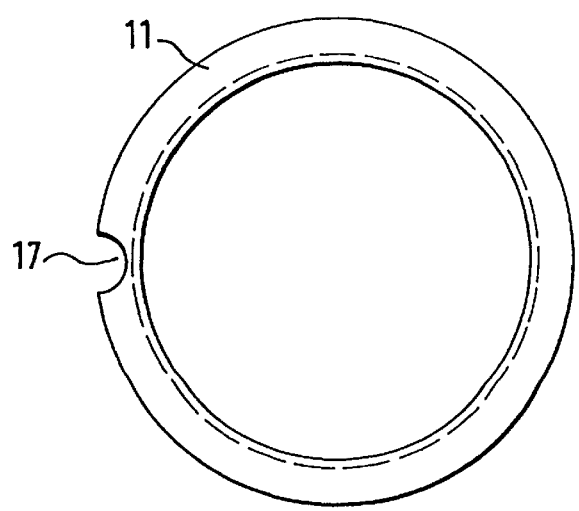

As shown in FIG. 2, the teeth 18 are distributed evenly over the periphery of flange 11 of the sensor-accommodating housing 6 so that tooth gaps 20 of uniform width are produced, with the exception of a widened tooth gap 21 which is used herein to determine the angular position of the sensor 7 in the sensor accommodation. Sensor flange 12 is subdivided in its radially outwardly directed portions so that, upon insertion of the sensor 7 in the accommodating housing, the sensor flange 12 engages the tooth gaps 20, 21 and, upon rotation (see FIG. 4), the individual prongs 19, 19' backgrip the teeth 18. FIG. 4 shows the engagement after the rotation of the inserted sensor relative to the flange 11 of the sensor-accommodating housing, or relative to the teeth 18. In this embodiment of the present invention, the angular position of the sensor 7 in the sensor-accommodating housing 6 is predetermined by widening a portion or prong 19' of the sensor flange 12 which fits into the enlarged tooth gap 21.

Further, FIG. 4 shows a hook 22 which is part of one of the two flanges, i.e., either the flange 11 on the sensor-accommodating housing or the sensor flange 12. After rotation of the inserted sensor, the hook 22 engages a corresponding opening of the companion flange and thereby prevents inadvertent detachment of the sensor.

The insertion of the sensor 7 into the sensor-accommodating housing 6 and, thus, the sensor flange 12 into the tooth gap 20, 21 and the subsequent rotation of the sensor 7 functions like an attachment by a multiple thread. Appropriately, the hook 22 is configured as a spiral spring which springs outwardly upon rotation of the sensor 7 in the housing and thereby provides the locking mechanism that prevents the sensor from turning back. After the spring has been pushed back by a pin, the sensor 7 may be turned out of the accommodating housing again. This type of assembly is free from clearances. Determining the annular position is simple and accurate and does not require any tool.

The sensor flange is preferably an injection molded plastic part which can be made in one operation along with the sensor coating.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

We claim:

1. For use in measuring rotary motion of a wheel, a wheel bearing sensor assembly comprising:

a signal generator ring configured and arranged to rotate with the wheel;

a sensor-accommodating housing comprising a deep drawn rotation-symmetric sheet-metal part having a radially outwardly directed annular, hook-shaped, or prong-shaped flange on a sensor insertion side; and a speed sensor arranged to be inserted in the sensor insertion side of and retained in a fixed position by the sensor-accommodating housing, the speed sensor having a sensor flange that engages the flange of the sensor-accommodating housing when the speed sensor is inserted in the sensor insertion side of the sensor-accommodating housing, wherein the flange of the sensor-accommodating housing has radially outwardly directed teeth that are substantially evenly distributed over the periphery so as to define tooth gaps, and each tooth having an angle of inclination relative to an end face of the flange of the sensor-accommodating housing, the end face being disposed perpendicularly to an axis of the speed sensor, and wherein the sensor flange has prongs that engage the tooth gaps upon insertion of the speed sensor, said prongs backgripping the teeth after rotation of the speed sensor in the sensor-accommodating housing.

2. A wheel bearing sensor assembly, according to claim 1, wherein the sensor-accommodating housing is arranged perpendicular to an axis of rotation of the wheel and is attached to a stationary wheel bearing ring by one of a press fit and a snug fit.

3. A wheel bearing sensor assembly, according to claim 1, wherein one of the tooth gaps is wider than the remaining tooth gaps, the relative width of the one of the tooth gaps determining the angular position of the sensor in the sensor-accommodating housing, and wherein a corresponding prong of the sensor flange is sized to be inserted into the one of the tooth gaps.

4. A wheel bearing sensor assembly, according to claim 1, wherein the teeth are elastically deformed when the speed sensor rotates and the prongs of the sensor flange backgrip the teeth of the flange of the sensor-accommodating housing.

5. A wheel bearing sensor assembly, according to claim 1, wherein rotation of the inserted speed sensor causes a hook elastically arranged on one of the sensor flange and the sensor-accommodating housing to resiliently engage a counterpart flange, thereby preventing return rotation of the sensor.

6. A wheel bearing sensor assembly, according to claim 1, wherein at least one of the sensor-accommodating housing and the speed sensor has a recess that is engaged by an element having a shape resembling one of a wedge, a pin, and a cam, the element being provided on one of the sensor and the sensor-accommodating housing to position the speed sensor in a predetermined angular position in the sensor-accommodating housing.

7. A wheel bearing sensor assembly, according to claim 1, wherein the speed sensor comprises a double-sided measuring coil having pole shoes projecting from both sides of the measuring coil, and is arranged in a signal generator perpendicularly to the axis of rotation of the wheel, the signal generator having at least one of inwardly directed teeth and undulated projections and having one of a bowl shape and a hollow cylindrical shape.

* * * * *